March 31, 1970 W. L. GARDNER 3,504,060
METHOD OF STRENGTHENING FLEXIBLE FIBER BUNDLES
Filed March 10, 1969 2 Sheets-Sheet 1

INVENTOR
WILLIAM L. GARDNER

BY Stowell & Stowell

ATTORNEYS

March 31, 1970     W. L. GARDNER     3,504,060
METHOD OF STRENGTHENING FLEXIBLE FIBER BUNDLES
Filed March 10, 1969     2 Sheets-Sheet 2

INVENTOR
WILLIAM L. GARDNER
BY Stowell & Stowell
ATTORNEYS

__United States Patent Office__

3,504,060
Patented Mar. 31, 1970

---

3,504,060
METHOD OF STRENGTHENING FLEXIBLE FIBER BUNDLES
William L. Gardner, Wellesley, Mass., assignor to The Bendix Corporation, Detroit, Mich., a corporation of Delaware
Continuation-in-part of application Ser. No. 489,678, Sept. 23, 1965. This application Mar. 10, 1969, Ser. No. 813,396
Int. Cl. B29d 11/00; B32b 31/06
U.S. Cl. 264—1   9 Claims

ABSTRACT OF THE DISCLOSURE

A flexible fiber optical bundle composed of a plurality of fibers orientated in spaced apart generally parallel relation and terminating in at least one rigid end is strengthened at the interface between the fibers and the rigid end by establishing a temperature gradient parallel to and along the longitudinal axes of the fibers of the bundle in a zone including said rigid end and the fibers adjacent thereto with the higher temperature of such established gradient being at the rigid end. With such temperature gradient established a hardenable fluid, which when hardened is solid at room temperature, is flowed as a liquid generally radially into the bundle adjacent the rigid end so that it flows from the outside of the bundle into the center with substantially little flow along the longitudinal axes of the fibers. The temperature gradient ensures the correct distribution of the liquid which is then permitted to cure or set.

CROSS-REFERENCE TO RELATED APPLICATION

This application is a continuation-in-part of application Ser. No. 489,678, filed Sept 23, 1965 and now abandoned, and now this invention relates to a new and improved method of strengthening flexible fiber bundles and to improved strengthened fiber bundles.

Throughout the specification and claims the term "flexible fiber bundles" includes a plurality of fleyible fiber optic image transmitting glass and the like fibers, flexible glass and metal fibers and flexible hollow fibers such as employed in gaseous diffusion apparatus. In general, each of the flexible fibers of the flexible fiber bundle are in a size range of from about .0003 to about .010 inch in diameter.

In one method of constructing flexible fiber bundles, particularly for optical transmission, small clad optical fibers are clad with a supercladding which is subsequently removed from the bundle by subjecting the bundle to chemical or mechanical etching. Generally, when a flexible fiber optic bundle is formed by such a process it is necessary to retain small sections of the supercladding at each end of the fiber bundle. In the small end sections the individual fibers are immovable with respect to each other and thereby retain the orientation with respect to each other which is necessary for good optical or optical and electrical resolutions.

The transition regions, from the solid end portions to the free fiber portion, of such a bundle will be referred to hereinafter as the "fiber root areas." In the fiber root areas the flexible fiber bundle is mechanically extremely fragile for adjacent the fiber root areas the fibers are separated from each other and in the root areas per se the fibers are held in rigid unyielding manner. Depending on the diameter of the individual fibers and the resulting flexibility, the fibers will naturally touch each other some distance from the root areas and this touching assists in the mutual support of the fibers. However, any bending action applied to such a bundle as a whole acts to snap off the fibers in the root areas for the fibers in such areas are unable to support each other and bending action strains each fiber sequentially such that a sequential cracking occurs materially reducing the utility of flexible fiber bundles.

It is an object of the present invention to provide a method of strengthening the individual fibers in a zone adjacent the solid root areas whereby breaking of the fibers adjacent the root areas is substantially eliminated.

A further object of the present invention is to provide a method of strengthening flexible fiber bundles wherein the solid root areas may be entirely eliminated and the fibers adjacent the ends of the bundle are held in closer association thereby increasing the overall light carrying capacity of fiber bundles constructed in accordance with the teachings of this invention.

Other objects and advantages of the present invention are provided by a method of strengthening flexible fiber bundles having rigid root ends comprising:

Establishing a relatively low temperature about the fibers in a zone adjacent the rigid root ends of a flexible bundle of fibers;

Flowing a hardenable fluid about the said rigid root ends of the bundle adjacent said low temperature zone; and Permitting the fluid to harden, preferably by maintaining said relatively low temperature zone during hardening of said hardenable fluid.

The invention will be more fully described with reference to accompanying drawings wherein.

The invention will be described with reference to the drawings and as applied to fiber optical bundles; however, the invention is equally applicable to the manufacture of hollow fiber bundles as disclosed in U.S. patent application Ser. No. 178,526 filed Mar. 6, 1962, J. W. Hicks, Jr., now U.S. Patent No. 3,262,251 and assigned to applicant's assignee and to the method of making metal cored glass fiber structures and devices as disclosed in application Ser. No. 443,740, filed Mar. 1, 1965, John W. Hicks, Jr., now U.S. Patent No. 3,265,480 and assigned to applicant's assignee.

Figure 1:
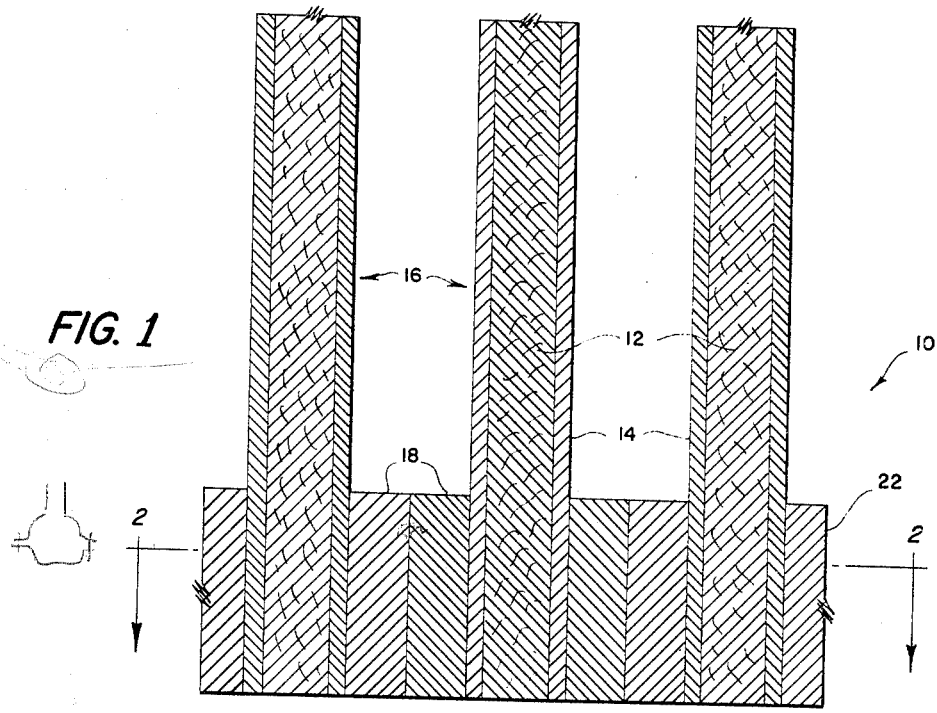
FIGURE 1 is an enlarged fragmentary sectional view of a portion of a flexible fiber optic image transmitting bundle.
Figure 2:
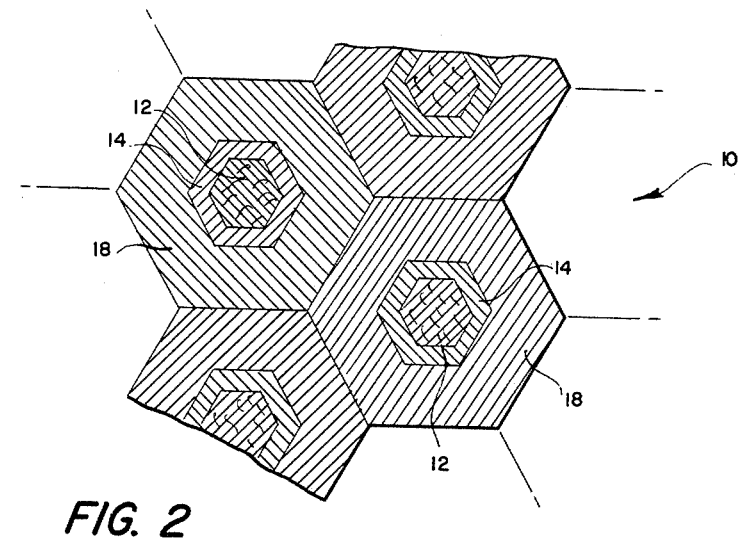
FIGURE 2 is an enlarged fragmentary section substantially on line 2—2 of FIGURE 1.

Referring to the drawings, and particularly to FIGURES 1 and 2, 10 generally designates a bundle of glass fibers adapted to transmit an image. The bundle consists of a plurality of optical glass rods 12 of relatively high refractive index. Each of the glass rods is provided with a coating or cladding 14 of glass having a relatively lower index of fraction. The fibers 16 consisting of the optical cores 12 and the cladding 14 are maintained in end-to-end correspondence by a further super cladding 18 which may comprise a glass composition substantially less resistant to etching than the cladding 14.

In the manufacture of the structure illustrated in FIGURES 1 and 2, the glass rod 12, having a high index of refraction is coated with the glass tube 14 of relatively lower index of refraction and with the supercladding 18 which is substantially less resistant to etching than the glass cladding 14, by coating and drawing processes employed in the fiber optical arts. The coating and drawing process performed on the fibers may be carried out by the technique disclosed in U.S. patent application Ser. No. 154,663, J. W. Hicks, Jr., filed Nov. 24, 1961 and now U.S. Patent No. 3,146,082.

The elemental fibers consisting of a core and the pair of cladding 14 and 18 are normally bundled together and redrawn to rigid fused multiple fibers and the multiple fibers are cut into the desired lengths, bundled and pressed together at a temperature such that fiber groups merge and become relatively indistinguishable. The ends of the rigid bundle are then coated with an acid resist which delineates the portion of the bundle which is to remain intact and form the solid root areas, and which portion will have the more readily etchable glass 18 removed to expose the spaced clad fibers.

Typical acid resists may comprise paraffin, polyethylene, plastic pressure sensitive adhesive tape, and commerical photo resists which may be precisely applied following known photographic techniques.

The invested bundle is then placed in a suitable etching solution and portions of the coating 18 are removed to provide the flexible bundle having fiber root areas at opposite ends.

If glass 18 comprises, for example, 38% $SiO_2$; 35% SiO; 2% CaO and 25% $B_2O_3$, a suitable etching solution may comprise 1% hydrofluoric acid solution or, for example, a solution consisting of 1% hydrochloric acid and 5% nitric acid. The hydrochloric and nitric acid solution has been found to be more desirable for use in etching the specific glass formulation referred to above in that it has a larger discrimination ratio between glass 18 and cladding 14 if the cladding 14 comprises for example $SiO_2$, 44.9%, $Na_2O$, .5%; $K_2O$, 8% and PBO 46.6%. During the etching process it is generally recommended that the bundle be periodically rinsed in distilled water in order to avoid residue accumulation which might affect the uniformity of the etching.

Following the etching the flexible bundle is then ready for strengthening according to the teachings of the present invention which may be summarized as follows:

(1) establishing a steep temperature gradient along the bundle in the vicinity of the bundle root;

(2) introducing a flowable material near the root of the bundle in such a manner that it flows from the outside of the bundle into the center with substantially little flow along the fibers of the bundle;

(3) the flowable hardenable material is subsequently processed or subjected to indurating conditions so as to cure or harden.

The process will be described in greater detail with reference to FIGURES 3 and 4 of the drawings.

Figure 3:
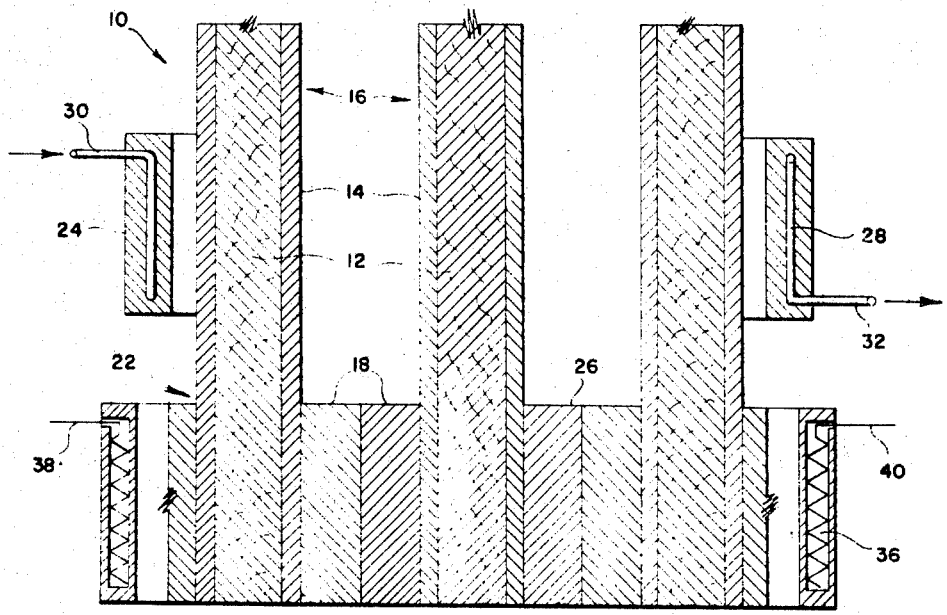
FIGURE 3 is a diagrammatic view similar to that illustrated in FIGURE 1 showing apparatus adapted to carrying out the present invention.
Figure 4:
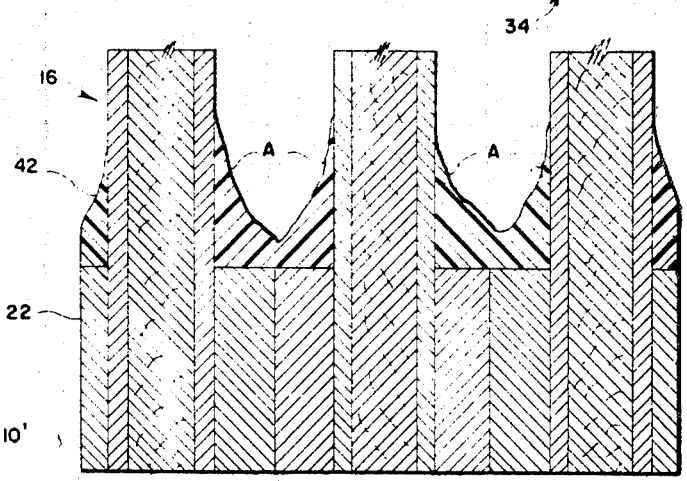
FIGURE 4 is a view similar to that illustrated in FIGURE 1 illustrating the results of the strengthening method of the present invention.

Referring particularly to FIGURE 3 the steep temperature gradient is established about the root end or area 22 of the bundle 10 by placing a first ring 24 about the loose fibers of the bundle at a location adjacent the solid end 22. Positioning of the ring 24 approximately one-half inch from the inner surface 26 of the solid end 22 has been found to provide satisfactory results. The ring 24 is maintained at a low temperature by, for example, flowing a coolant through the internal passage 28 in the ring 24 via inlet and outlet means 30 and 32. In view of the small diameters of the fibers of the bundle the cooling ring 24 and the heating ring, to be described hereinafter, are not to the same scale as the fibers of the bundle.

Through the use of cooling ring 24 the temperature of the fibers, in the vicinity of the ring, can be maintained at the desired value. A desirable range is from, for example, 0 to $-100°$ Fahrenheit. Further, in order to establish the substantial temperature gradient adjacent the solid root 22 a further ring 34 is placed about the solid area. Ring 34 is provided with means, such as electrical resistance means 36, for heating the ring and the adjacent root area. The electrical resistance heater 36 is provided with electrical current via terminals 38 and 40.

The heated ring will maintain the root area at the desired temperature and a desirable range is from about 100 to 400° Fahrenheit. With the hot and cold rings spaced approximately ½″ apart an extremely sharp temperature gradient is maintained in the zone of the root area. It is to be pointed out that a desirable characteristic of the temperature gradient is that it be substantially uniform from the outside of the bundle to the inside.

After the desired temperature gradient is established the next step is to introduce the flowable, hardenable material into the bundle. A suitable flowable material, for example an epoxy resin, will rapidly move from outside the bundle toward its core in view of the heating of the root area. The tendency of the flowable hardenable material to move upwardly along the fibers, which would be its normal course, is effectively and efficiently stopped by the congealing of the flowable material as it approaches the low temperature zone created by cooling ring 24.

It will be appreciated by those skilled in the art that while the cooling zone reduces the tendency of the epoxy resin to wick up each fiber or fiber bundle, the heated zone is equally as important. Heating the solid root end and the root area achieves a rapid radially inward movement of the hardenable material as the heat lowers its viscosity sufficiently that complete penetration of the bundle can be achieved within a few minutes whereas without the heat the epoxy resin would harden prior to complete penetration of the bundle.

The flow of the flowable material about the bundle may be achieved by immersing the root area in a vessel containing a suitable flowable hardenable material or by introducing, about the outer periphery of the root area 22, a small amount of for example an epoxy resin. After the flowable material has reached the center and a state of equilibrium exists, the heated condition of the root area is maintained while maintaining the low temperature adjacent to the root area. Under these conditions the hardenable material will be readily cured and the zone adjacent the root area will appear as diagrammatically illustrated in FIGURE 4 with the hardenable material 42 projecting only slightly up each fiber as indicated by reference arrows A. The ideal wetting action occurs generally only at the base of each of the fibers for optimum distribution of stresses.

An example of a suitable flowable material is an epoxy resin which is heat hardened upon the addition of a conventional epoxy catalyst. Other possible or suitable hardenable materials are conventional glass resins, glass solders, natural and synthetic rubber cements, silicone resins and the like.

Following the procedures of the present invention, results in an extremely strong fiber bundle. For example, a .2 inch diameter bundle of approximately 10,000 fibers can be bent into a ½ inch radius starting at the root area without breakage of the fibers at the root area interface. It is estimated that a bundle strengthened in accordance with the teaching of the present invention is from about 1,000 to 10,000 times stronger than a conventional bundle.

In FIGURES 1 through 4 of the drawings the fiber bundles have been illustrated as composed of individual fibers each of which is provided with a cladding and a supercladding. However, it will be recognized that the present invention is not restricted to such bundles. For example the flexible fiber bundle may consist of a plurality of multiple sub-bundles consisting of from, for example, 10 to 50 or more core fibers each of which is provided with only its optical cladding. The optical claddings are then fused together into a solid strand of glass approximately .002 to .003 inch in diameter. The multiple fiber strand is then provided with a supercladding and a plurality of superclad multiple fiber bundles are fused into a single bundle which is then treated or processed in the same way as described hereinbefore. The use of multiple fiber sub-bundles is advantageous in that their size presently is optimum for processing and handling following the teachings of this invention.

Each of the multiple fiber sub-bundles may be cut to length and pressed and fused together or the sub-bundle may be cut, stacked together and redrawn, before being cut to length and pressed and fused together.

EXAMPLE

A bundle of optical fibers was constructed from a plurality of clad fibers wherein each of the fibers thereof consisted of an optical core glass, a cladding consisting of 73.6% $SiO_2$; 16% $Na_2O$; .6% $K_2O$; 5.2% CaO; 3.6% MgO and 1% $Al_2O_3$ and a further cladding consisting of 40% $SiO_2$; 35% BaO; 2% CaO and 25% $B_2O_3$. Following the formation of original bundle end areas of the bundle were coated with paraffin and the coated bundle was etched in a solution consisting of 1% hydrochloric acid and 5% nitric acid. During the etching process the bundle was periodically rinsed in distilled water to remove residue from between the fibers resulting from the etching procedure. Following etching the paraffin was dissolved from the unetched portion of the bundle. A cooling ring was placed about ½ inch above the inner face of each root portion of the bundle and a heating ring was placed about each solid root area of the bundle. The temperatures of the plural rings were adjusted so that the solid root areas were maintained at a temperature of about 300° F. while the loose portions of the bundle adjacent the cold rings were maintained at a —50° F. A commercial epoxy resin and catalyst was flowed about each root area of the bundle and in approximately 3 minutes the epoxy resin had reached the center of the bundle and a state of equilibrium existed. The heating and cooling of the bundle ends were maintained for approximately 6 hours during which time the epoxy resin had fully cured and the fibers of the bundle adjacent the root areas were materially strengthened.

As is well known in the plastics art, epoxies with or without catalysts, are of wide and diverse natures and characteristics and there are well known commercially available epoxies which will harden under various and differing conditions, with or without temperature stimulation, and such will be effective for use as the hardenable fluid of the present invention. It is considered that the essential characteristic of such hardenable fluid is that when it is hardened it is solid at room temperature.

Thus instead of maintaining the established temperature gradient to cure or set the hardenable fluid as specifically recited in the foregoing example, it has been found that the surface tension forces are sufficiently strong so that, after the hardenable fluid is flowed as a liquid radially into the bundle adjacent the rigid end of the bundle or root areas or portions of the fibers, removal of the established temperature gradient is permissible prior to liquid hardening without grossly undesirable liquid redistribution. In such instance, various hardening procedures may be utilized such as subjecting the bundle end to radiation, low temperatures or room temperature alone.

Thus following the foregoing example, the hardenable fluid, which is a commercial epoxy resin and catalyst, is flowed as a liquid radially into the bundle adjacent the rigid end. The established temperature gradient, which is the same as that set forth is the above example, ensures correct distribution of the fluid so that it flows from the outside of the bundle into the center with substantially little flow along the longitudinal axes of the fibers. Such temperature gradient is necessary for the correct distribution of the liquid to be hardened. However, after the liquid is thusly flowed into the bundle end, the surface tension forces are sufficiently strong so that the temperature gradient is removed prior to liquid hardening. The bundle may be removed from the cooling and heating rings following which the hardening procedure is effected.

Therefore, while it is desirable in accordance with the initial example that the hardening take place in the presence of the temperature gradient, such is not essential. But, the temperature gradient is necessary for correct distribution of the epoxy resin and catalyst, that is the hardenable fluid. The flush inserted radially into the bundle must enter as a liquid and eventually must set or cure and harden. However, the precise manner in which it is set or cured is not the determinative factor of the effectiveness of the present invention. Rather the critical factor is the establishment of the temperature gradient prior to the introduction of the resinous composition and the flowing of the composition, as a liquid, into the bundle rigid end with such temperature gradient established so that the temperature gradient serves to prevent or reduce to a minimum wicking action of the liquid resinous composition along the longitudinal axes of the parallel fibers as the resinous liquid works its way towards the center of the bundle. Thus, the temperature gradient is essential for the correct distribution of the hardenable fluid.

Figure 5:
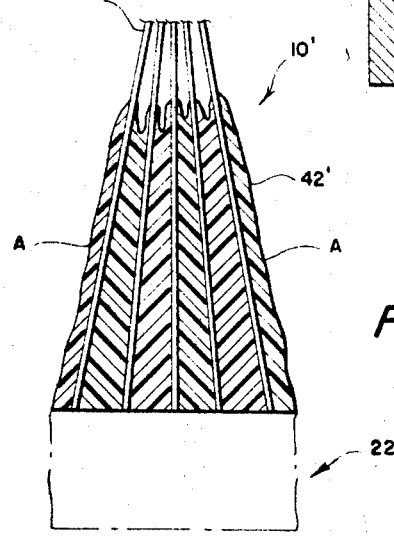
FIGURE 5 is a view similar to that shown in FIGURE 4 of a modified method of the present invention.

Following the teachings of the present invention the optical properties of a flexible bundle of fibers may be improved and the ends of the bundle maintained in exact correspondence as illustrated in FIGURE 5 of the drawings. Referring to FIGURE 5, where like structures are provided with primed reference characters, there is illustrated a flexible fiber bundle 10' comprising clad optical fibers 16' and a root area 22'. During the treatment of the optical fibers 16' the loose portion of the bundle is squeezed together whereby upon setting, curing or hardening of the flowable hardenable material 42' the bundle adjacent the root area 22', appears approximately as illustrated in FIGURE 5. Following the hardening of the resin, the root area 22' may be sliced from the bundle in the zone illustrated by broken line A—A. The resulting product has improved light carrying capacity as each of its fibers are closer together thus minimizing the interfiber spacing. Bundles constructed as illustrated in FIGURE 5 and discussed above also have the improved strength feature of the bundles described in reference to FIGURES 3 and 4 of the application.

From the foregoing description it will be seen that the present invention provides improved methods of making fiber bundles and fiber bundle devices. While various methods and fiber bundle structures have been illustrated by way of example, other modifications and uses are contemplated as being within the scope of the present invention.

What is claimed is:

1. A method of strengthening a flexible fiber optical bundle composed of a plurality of fibers in spaced apart generally parallel relation terminating in at least one rigid end comprising; establishing a temperature gradient parallel to and along the longitudinal axes of the fibers of the bundle in a zone including said one rigid end and the flexible fibers adjacent thereto and with the higher temperature of the established gradient being at the said one rigid end; flowing a hardenable fluid, which when hardened is solid at room temperature, into said temperature gradient zone; and maintaining the established temperature gradient during hardening of the hardenable fluid.

2. The method defined in claim 1 including the step of removing the said one rigid end after hardening of the hardenable fluid whereby the fibers are maintained in a predetermined relation by the hardenable fluid.

3. The invention defined in claim 1 wherein the flexible fibers adjacent said one rigid end are maintained in closely spaced relationship during hardening of said hardenable fluid.

4. The method defined in claim 1 wherein the temperature gradient is established by heating the said one rigid end to about 100 to 400° F. and cooling the fibers adjacent the said one rigid end to about 0 to —100° F.

5. The invention defined in claim 4 wherein the hardenable fluid comprises an epoxy resin.

6. A method of strengthening a flexible fiber optical bundle composed of a plurality of fibers in spaced apart generally parallel relation terminating in at least one rigid end comprising; establishing a temperature gradient parallel to and along the longitudinal axes of the fibers of the bundle in a zone including said one rigid end and the flexible fibers adjacent thereto and with the higher temperature of the established gradient being at the said one rigid end; flowing a hardenable fluid, which when hardened is solid at room temperature, into the bundle at said temperature gradient zone and then permitting the hardenable fluid to harden.

7. The method defined in claim 6 wherein prior to the hardening of the hardenable fluid the temperature gradient is removed.

8. The method defined in claim 6 wherein the established temperature gradient is maintained during the hardening of the hardenable fluid.

9. A method of strengthening a flexible fiber optical bundle composed of a plurality of fibers in spaced apart generally parallel relation terminating in at least one rigid end comprising: establishing a temperature gradient parallel to and along the longitudinal axes of the fibers of the bundle in a zone including said one rigid end and the flexible fibers adjacent thereto and with the higher temperature of the established gradient being at the said one rigid end; flowing a fluid into said temperature gradient established zone, the higher temperature being sufficient to cause fluid flow by wicking action towards the center of the bundle in the zone of higher temperature and the temperature gradient being steep enough to restrain fluid flow along the fibers in a zone of lower temperature adjacent the zone of higher temperature, and maintaining the established temperature gradient during hardening of the hardenable fluid.

References Cited

UNITED STATES PATENTS

| | | | |
|---|---|---|---|
| 1,913,419 | 6/1933 | Watts | 264—327 |
| 2,643,158 | 6/1953 | Baldanza | 264—243 |
| 2,672,640 | 3/1954 | Peterson et al. | 264—243 |
| 2,992,956 | 7/1961 | Bazinet | 264—1 |
| 3,104,191 | 9/1963 | Hicks et al. | 264—1 |
| 3,128,167 | 4/1964 | Woodcock | 264—1 |
| 3,148,967 | 9/1964 | Hicks | 264—1 |
| 3,215,029 | 11/1965 | Woodcock | 264—1 |
| 3,253,896 | 5/1966 | Woodcock et al. | 264—1 |
| 3,255,280 | 6/1966 | Burrowes | 264—1 |
| 3,301,648 | 1/1967 | Sheldon | 264—1 |

JULIUS FROME, Primary Examiner

A. H. KOECKERT, Assistant Examiner

U.S. Cl. X.R.

65—4; 264—28, 261, 327; 350—96